(12) United States Patent
Ben David et al.

(10) Patent No.: US 11,544,780 B2
(45) Date of Patent: Jan. 3, 2023

(54) CUSTOMIZED CREDIT CARD DEBT REDUCTION PLANS

(71) Applicant: Intuit Inc., Mountain View, CA (US)

(72) Inventors: Daniel Ben David, Kibbutz Harel (IL); Yehezkel Shraga Resheff, Tel Aviv (IL); Yair Horesh, Kfar-Saba (IL); Nirmala Ranganathan, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/937,400

(22) Filed: Jul. 23, 2020

(65) Prior Publication Data

US 2022/0027983 A1    Jan. 27, 2022

(51) Int. Cl.
  *G06Q 40/02*  (2012.01)
  *G06N 20/00*  (2019.01)
  *G06K 9/62*   (2022.01)
  *G06N 7/00*   (2006.01)

(52) U.S. Cl.
  CPC .......... *G06Q 40/02* (2013.01); *G06K 9/6256* (2013.01); *G06N 7/005* (2013.01); *G06N 20/00* (2019.01); *G06Q 40/025* (2013.01)

(58) Field of Classification Search
  None
  See application file for complete search history.

(56) References Cited

U.S. PATENT DOCUMENTS

| 8,533,092 B1 * | 9/2013 | Burrow | G06Q 40/02 |
| | | | 705/37 |
| 11,094,008 B2 * | 8/2021 | Wolfe | G06Q 40/025 |
| 11,145,005 B2 * | 10/2021 | Brock | G06Q 20/223 |
| 2004/0044604 A1 | 3/2004 | O'Neil | |

(Continued)

FOREIGN PATENT DOCUMENTS

AU    2020100708 A4 *  6/2020

OTHER PUBLICATIONS

Hua, et al., "A Brief Review of Machine Learning and its Application", 2009, Information Engineering Institute Capital Normal University, entire document pertinent (Year: 2009).*

(Continued)

*Primary Examiner* — Paul S Schwarzenberg
(74) *Attorney, Agent, or Firm* — Paradice and Li LLP

(57) ABSTRACT

This disclosure relates to systems and methods for constructing a customized debt reduction plan for a user. In some implementations, a customized debt reduction system obtains a plurality of financial attributes of the user and a plurality of other users, where the plurality of financial attributes are indicative of credit card debt, and identifies users from the plurality of other users who successfully repaid their credit card debt based on their respective financial attributes and one or more repayment techniques that resulted in successful repayment of their credit card debt. The customized debt reduction system correlates the plurality of financial attributes of the user with the plurality of financial attributes of a number of the identified users and (Continued)

determines a personalized score for the user, using a trained machine learning model, based on the correlation to determine a customized debt reduction plan for the user based on the personalized score.

20 Claims, 6 Drawing Sheets

(56) References Cited

U.S. PATENT DOCUMENTS

| | | | |
|---|---|---|---|
| 2009/0030819 A1* | 1/2009 | VanLeeuwen | G06Q 40/02 |
| | | | 705/30 |
| 2016/0232546 A1* | 8/2016 | Ranft | G06Q 40/025 |
| 2020/0074539 A1* | 3/2020 | Palaghita | G06Q 40/025 |
| 2020/0082444 A1* | 3/2020 | Benkreira | G06Q 40/02 |
| 2020/0294138 A1* | 9/2020 | Celia | G06Q 40/08 |
| 2020/0327604 A1* | 10/2020 | Morin | G06N 20/20 |
| 2020/0387965 A1* | 12/2020 | Celia | G06Q 30/018 |
| 2021/0390875 A1* | 12/2021 | Ranganathan | G06Q 40/02 |

OTHER PUBLICATIONS

International Search Report and Written Opinion, dated Sep. 10, 2021, issued in PCT Application No. PCT/US2021/033871, 13-pages.

* cited by examiner

CUSTOMIZED CREDIT CARD DEBT REDUCTION PLANS

TECHNICAL FIELD

This disclosure relates generally to reducing credit card debt and, more specifically, to customizing credit card debt reduction plans for individual users.

DESCRIPTION OF RELATED ART

Household debt levels have increased steadily over the past several decades due to a variety of factors, including steadily rising costs of living that outpace income levels for many people. Rising levels of credit card debt are of particular concern due to the relative ease with which people are able to obtain credit cards combined with the relatively high interest rates charged by credit card companies. For example, during periods of time when the Federal lending rate is very low, or even approaches zero percent, credit card companies typically maintain their interest rates at relatively high levels that often exceed 25 percent or more, which makes it very difficult for many people to repay their credit card debt. Although there are many options and credit card debt reduction strategies available, many consumers struggle to determine which strategy, or combination of strategies, will provide the greatest likelihood of repaying their credit card debt. In addition, most (if not all) of the commonly-available debt reduction options and strategies fail to consider the demographic attributes of consumers, which may not only vary between consumers but may also have a significant impact on the likelihood of a particular debt reduction strategy being successfully used by various consumers.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for reducing credit card debt of a user. The method can be performed by one or more processors of a computing device, and includes determining a set of financial attributes and a demographic profile of each of a plurality of consumers, identifying a number of the consumers who successfully repaid credit card debt based at least in part on their respective sets of financial attributes, determining a plurality of debt reduction plans used by the identified consumers to repay their respective credit card debts, and correlating one or more financial attributes and a demographic profile of the user with the sets of financial attributes and the demographic profiles, respectively, of the identified consumers. The method also includes training a machine learning model, using the correlations of financial attributes and demographic profiles between the user and the identified consumers, to determine a likelihood of the user repaying the credit card debt using each of the determined debt reduction plans, and determining a customized debt reduction plan for the user based on the determined likelihoods.

In some implementations, each set of financial attributes can be indicative of credit card debt associated with a respective consumer, and may include one or more of an amount of previous credit card debt, an amount of current credit card debt, an annual percentage rate (APR) associated with the credit card debt, payment due dates associated with the credit card debt, net savings of the respective consumer, net cash flow of the respective consumer, or an intent of the respective consumer to pay-off the credit card debt. In some instances, the financial attributes of the consumers can be extracted from financial transactions of electronic payment services associated with the consumers, financial transactions associated with the credit cards of the consumers, credit score information of the consumers, and/or other sources of financial information pertaining to the consumers. The demographic profile for a respective consumer can include any number of demographic attributes including, for example, job type or profession, employment status, age, level of education, and/or an indication of a single-income family or a multi-income family.

In some implementations, the financial attributes and demographic profile of the user can be correlated with respective sets of financial attributes and demographic profiles of the identified consumers by determining similarities between a selected group of the financial attributes and/or the demographic profile of the user and a corresponding group of the financial attributes and/or the demographic profile of each identified consumer. In some other implementations, the correlation can be determined by clustering the number of identified consumers into one or more groups based on their respective sets of financial attributes and demographic profiles, and then correlating the financial attributes and demographic profile of the user with respective sets of financial attributes and demographic profiles of each group of identified consumers.

In some implementations, the machine learning model can be a neural network trained to determine a probability vector based on the determined likelihoods, where the probability vector indicates a likelihood of the user successfully repaying the credit card debt within a time period using each of the plurality of determined debt reduction plans. In some instances, the customized debt reduction plan can be determined by using the neural network to rank the plurality of determined debt reduction plans based on the probability vector, and to determine a personalized debt reduction plan for the user based on the rankings. The personalized debt reduction plan can include portions of one or more of the plurality of determined debt reduction plans. In some implementations, the method can also include determining feedback indicative of the user's progress in repaying the credit card debt using the customized debt reduction plan, retraining the machine learning model based on the determined feedback, and modifying the customized debt reduction plan using the retrained machine learning model.

Another innovative aspect of the subject matter described in this disclosure can be implemented in a system for reducing credit card debt of a user. The system can include one or more processors, a machine learning model communicatively coupled with the one or more processors, and a memory communicatively coupled with the one or more processors and the machine learning model. The memory can store instructions that, when executed by the one or more processors in conjunction with the machine learning model, cause the system to determine a set of financial attributes and a demographic profile of each of a plurality of consumers, identify a number of the consumers who successfully repaid credit card debt based at least in part on their respective sets of financial attributes, determine a plurality of debt reduction plans used by the identified consumers to repay their respective credit card debts, correlate one or more financial attributes and a demographic profile of the user with the sets of financial attributes and the demographic profiles, respectively, of the identified consumers, train a machine learning model, using the correlations of financial attributes and demographic profiles between the user and the identified consumers, to determine a likelihood of the user repaying the credit card debt using each of the determined debt reduction plans, and determine a customized debt reduction plan for the user based on the determined likelihoods.

In some implementations, each set of financial attributes can be indicative of credit card debt associated with a respective consumer, and may include one or more of an amount of previous credit card debt, an amount of current credit card debt, an annual percentage rate (APR) associated with the credit card debt, payment due dates associated with the credit card debt, net savings of the respective consumer, net cash flow of the respective consumer, or an intent of the respective consumer to pay-off the credit card debt. In some instances, the financial attributes of the consumers can be extracted from financial transactions of electronic payment services associated with the consumers, financial transactions associated with the credit cards of the consumers, credit score information of the consumers, and/or other sources of financial information pertaining to the consumers. The demographic profile for a respective consumer can include any number of demographic attributes including, for example, job type or profession, employment status, age, level of education, and/or an indication of a single-income family or a multi-income family.

In some implementations, the financial attributes and demographic profile of the user can be correlated with respective sets of financial attributes and demographic profiles of the identified consumers by determining similarities between a selected group of the financial attributes and/or the demographic profile of the user and a corresponding group of the financial attributes and/or the demographic profile of each identified consumer. In some other implementations, the correlation can be determined by clustering the number of identified consumers into one or more groups based on their respective sets of financial attributes and demographic profiles, and then correlating the financial attributes and demographic profile of the user with respective sets of financial attributes and demographic profiles of each group of identified consumers.

In some implementations, the machine learning model can be a neural network trained to determine a probability vector based on the determined likelihoods, where the probability vector indicates a likelihood of the user successfully repaying the credit card debt within a time period using each of the plurality of determined debt reduction plans. In some instances, the customized debt reduction plan can be determined by using the neural network to rank the plurality of determined debt reduction plans based on the probability vector, and to determine a personalized debt reduction plan for the user based on the rankings. The personalized debt reduction plan can include portions of one or more of the plurality of determined debt reduction plans. In some implementations, the method can also include determining feedback indicative of the user's progress in repaying the credit card debt using the customized debt reduction plan, retraining the machine learning model based on the determined feedback, and modifying the customized debt reduction plan using the retrained machine learning model.

Another innovative aspect of the subject matter described in this disclosure can be implemented in a system for reducing credit card debt of a user. In some implementations, the system includes means for determining a set of financial attributes and a demographic profile of each of a plurality of consumers, means for identifying a number of the consumers who successfully repaid credit card debt based at least in part on their respective sets of financial attributes, means for determining a plurality of debt reduction plans used by the identified consumers to repay their respective credit card debts, means for correlating one or more financial attributes and a demographic profile of the user with the sets of financial attributes and the demographic profiles, respectively, of the identified consumers, means for training a machine learning model, using the correlations of financial attributes and demographic profiles between the user and the identified consumers, to determine a likelihood of the user repaying the credit card debt using each of the determined debt reduction plans, and means for determining a customized debt reduction plan for the user based on the determined likelihoods. In some implementations, the system also includes means for determining feedback indicative of the user's progress in repaying the credit card debt using the personalized debt reduction plan, means for retraining the machine learning model based on the determined feedback, and means for modifying the personalized debt reduction plan using the retrained machine learning model.

In some implementations, each set of financial attributes can be indicative of credit card debt associated with a respective consumer, and may include one or more of an amount of previous credit card debt, an amount of current credit card debt, an annual percentage rate (APR) associated with the credit card debt, payment due dates associated with the credit card debt, net savings of the respective consumer, net cash flow of the respective consumer, or an intent of the respective consumer to pay-off the credit card debt. In some instances, the financial attributes of the consumers can be extracted from financial transactions of electronic payment services associated with the consumers, financial transactions associated with the credit cards of the consumers, credit score information of the consumers, and/or other sources of financial information pertaining to the consumers. The demographic profile for a respective consumer can include any number of demographic attributes including, for example, job type or profession, employment status, age, level of education, and/or an indication of a single-income family or a multi-income family.

Another innovative aspect of the subject matter described in this disclosure can be implemented in a non-transitory computer-readable medium. The non-transitory computer-readable medium stores instructions that, when executed by one or more processors in conjunction with a machine learning model in a system for reducing credit card debt of a user, causes the system to perform operations that include determining a set of financial attributes and a demographic profile of each of a plurality of consumers, identifying a number of the consumers who successfully repaid credit card debt based at least in part on their respective sets of financial attributes, determining a plurality of debt reduction plans used by the identified consumers to repay their respective credit card debts, correlating one or more financial attributes and a demographic profile of the user with the sets of financial attributes and the demographic profiles, respectively, of the identified consumers, training a machine learning model, using the correlations of financial attributes and demographic profiles between the user and the identified consumers, to determine a likelihood of the user repaying the credit card debt using each of the determined debt reduction plans, and determining a customized debt reduction plan for the user based on the determined likelihoods. In some implementations, the operations also include determining feedback indicative of the user's progress in repaying the credit card debt using the personalized debt reduction plan, retraining the machine learning model based on the determined feedback, and modifying the personalized debt reduction plan using the retrained machine learning model.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

Like reference numbers and designations in the various drawings indicate like elements.

DETAILED DESCRIPTION

Figure 1:
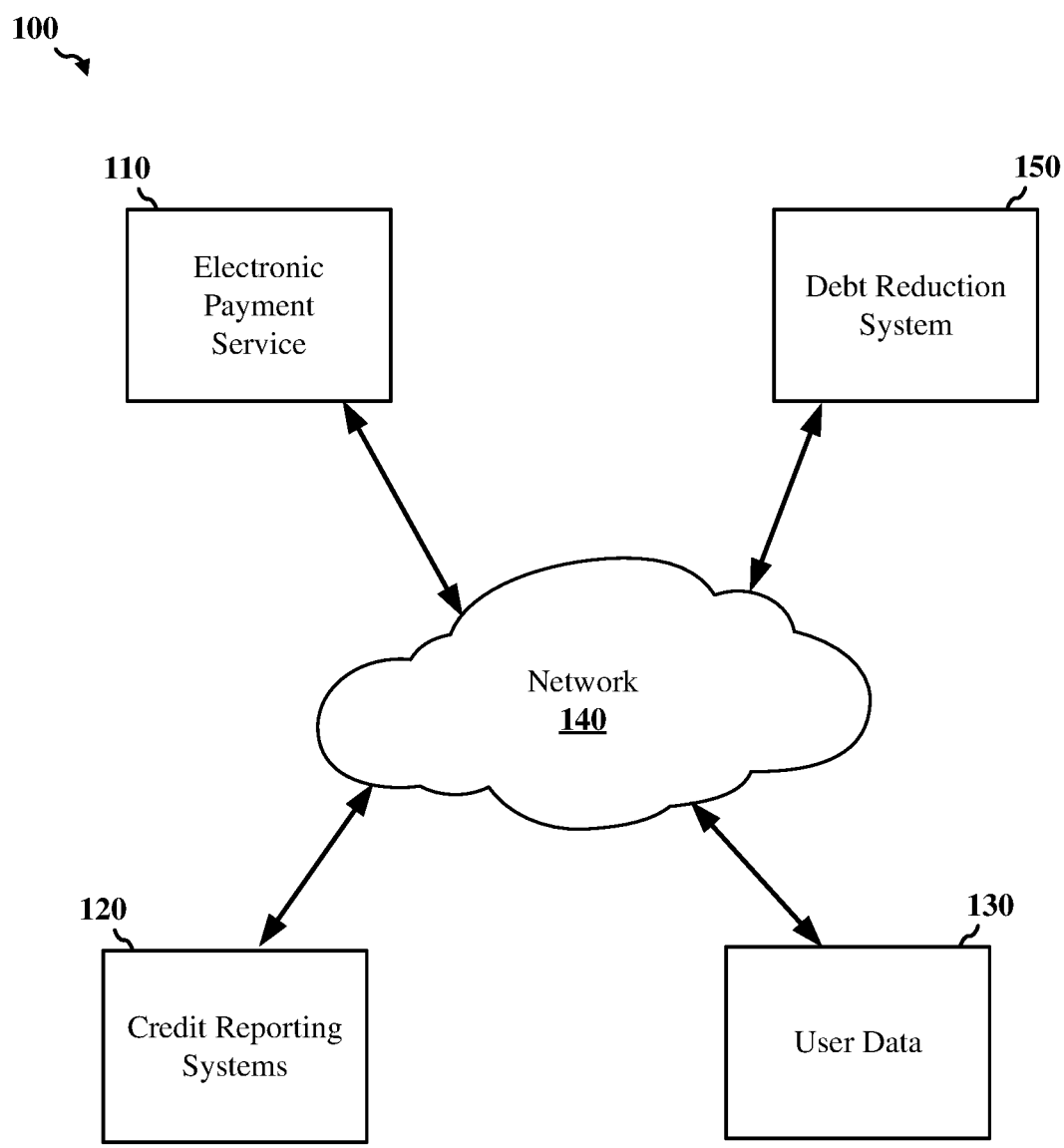
FIG. 1 shows a block diagram of an environment within which various aspects of the subject matter disclosed herein may be implemented.

The following description is directed to certain implementations for the purposes of describing the innovative aspects of this disclosure. However, a person having ordinary skill in the art will readily recognize that the teachings herein can be applied in a multitude of different ways. It may be readily understood that certain aspects of the disclosed systems and methods can be arranged and combined in a wide variety of different configurations, all of which are contemplated herein. The described implementations may be implemented in, or associated with, any electronic or online payment platform, retail banking system, or accounting, consumer credit monitoring or financial system for which it is desirable to determine customized debt repayment plans for a user based on observed or determined debt repayment characteristics. Although described herein with respect to an electronic payment service, aspects of the present disclosure are equally applicable to other electronic or online financial systems.

Implementations of the subject matter described in this disclosure can be used to determine a customized debt reduction plan for a user. In some implementations, a debt reduction system can interface with one or more electronic payment services, credit ratings agencies, banks, and/or other financial entities to obtain financial and demographic attributes of a plurality of consumers associated with credit card debt. The system can use the financial attributes to determine which consumers successfully repaid their credit card debt (hereinafter referred to as "successful consumers"), and determine which debt reduction plan was used by each of the successful consumers. In some instances, the system can also use the financial attributes to determine which consumers did not successfully repay their credit card debt—and thus still have outstanding credit card debt (hereinafter referred to as "unsuccessful consumers").

The system can correlate the financial and demographic attributes of the user with the financial and demographic attributes of the plurality of successful consumers to identify a group of successful consumers who are most similar to the user in one or more financial and/or demographic aspects. For example, if the user is a married 42 year-old female stock trader with no children, the system may identify successful consumers that are not married, have high-paying jobs, and do not have children. The system can determine a likelihood of the user repaying the credit card debt using each of the debt reduction plans that were used by the successful consumers most similar to the user, and then select or customize one of the debt reduction plans for the user based on the determined likelihoods of success of the debt reduction plans. In some instances, the system can use a machine learning model trained with the correlations of demographic and financial attributes to determine the likelihood that each respective debt reduction plan can be successfully employed by the user to repay outstanding credit card debt.

Various implementations of the subject matter disclosed herein provide one or more technical solutions to the technical problem of customizing a debt reduction plan for individual users that has an acceptable likelihood of success. Specifically, by customizing a debt reduction plan for a user based on debt reduction plans that have been successfully used by consumers having similar financial and demographic attributes as the user, the methods and systems disclosed herein can tailor a user's debt reduction plan in a manner that addresses the specific financial and demographic attributes of the user. In this way, the methods and systems disclosed herein may increase the likelihood that customized debt reduction plans determined for various users will be successfully employed by the users to repay their respective credit card debts, for example, as compared with conventional solutions that may not consider the specific financial and demographic attributes of individual users when recommending debt reduction plans.

Accordingly, various aspects of the present disclosure provide a unique computing solution to a unique computing problem that did not exist prior to electronic payment services that facilitate online financial transactions between hundreds of millions (if not billions) of consumers and a diverse array of credit card companies. More specifically, the problem of generating an automated (e.g., computer-generated) debt reduction plan that considers various financial and demographic attributes of a user did not exist prior to the widespread adoption of the Internet as a communications medium over which vast numbers of commercial transactions, consumer transactions, and financial transactions can be facilitated, and is therefore a problem rooted in and created by technological advances that made the Internet a necessity for facilitating electronic financial transactions.

As the commercial success and widespread adoption of electronic payment services increases, the dollar value of online purchases, deposits, transfers, and other transactions can now be expressed in terms of trillions of US dollars per year This rapid growth in online commerce, banking, investment, and other fields has also resulted in a significant increase in the amount of financial data that can be evaluated to construct a customized debt reduction plan for a user. For example, while the amount digital data generated by several online financial transactions may be small enough to be evaluated for credit card balances and net savings of a limited number of consumers, the vast amount of financial transactions and other financial data generated by modern electronic payment services, credit card companies, and credit rating companies require the computational power of modern processors and trained machine learning models to accurately identify consumers that successfully repaid their credit card debt and determine the types of debt reduction plans used by these successful consumers. Similarly, determining a correlation between the financial and demographic attributes of a user and the financial and demographic attributes of successful consumers require the computational power of modern processors and trained machine learning models. Therefore, implementations of the subject matter disclosed herein are not an abstract idea such as organizing human activity or a mental process that can be performed in the human mind, for example, because it is impractical, if not impossible, for a human mind to evaluate billions of financial transactions associated with millions of different consumers to determine which consumers were able to successfully repay their credit card debt, which debt reduction plans were used by these successful consumers, and which of these successful consumers have the most in common with a particular user.

In the following description, numerous specific details are set forth such as examples of specific components, circuits, and processes to provide a thorough understanding of the present disclosure. The term "coupled" as used herein means connected directly to or connected through one or more intervening components or circuits. The terms "processing system" and "processing device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory, and the like.

Various aspects of electronic credit card debt reduction systems will now be presented with reference to various apparatus and methods. These apparatus and methods will be described in the following detailed description and illustrated in the accompanying drawings by various blocks, components, circuits, devices, processes, algorithms, and the like (collectively referred to herein as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows an environment 100 within which aspects of the present disclosure can be implemented. The environment 100 is shown to include one or more electronic payment services 110, one or more credit reporting systems 120, user data 130, a communications network 140, and a debt reduction system 150. In other implementations, the environment 100 may include other components, devices, or systems not shown for simplicity.

The electronic payment services 110 can facilitate electronic transactions related to e-commerce such as, for example, online purchases, returns, chargebacks, credit, and transfers. In some instances, the electronic payment services 110 can also facilitate or process electronic transactions related to banking, investment, and other fields. The electronic payment services 110 can be implemented with, or may include, a plurality of servers of various types such as, for example, a web server, a file server, an application server, a database server, a proxy server, or any other server suitable for performing functions or processes described herein, or any combination thereof. Each server may be a unitary server or a distributed server spanning multiple computers or multiple datacenters, and may include hardware, software, or embedded logic components or a combination of two or more such components for carrying out the appropriate functionalities implemented or supported by the server. In some implementations, the electronic payment services 110 can include or can be associated with one or more major credit card companies, such as MasterCard®, Visa®, Discover®, American Express®, and so on.

The credit reporting systems 120 can be or can include any suitable company or agency that generates or monitors the credit ratings of consumers associated with credit card debt. The consumers may include persons having various demographic attributes including, for example, age, income level, job or profession, background, education level, family sizes, single-income family or a multi-income family, and so on. In some instances, various financial aspects of the consumers can be represented by one or more financial attributes including, for example, an amount of previous credit card debt, an amount of current credit card debt, APRs associated with the credit card debt, payment due dates associated with the credit card debt, net savings, net cash flow, or an intent of the user to pay-off the credit card debt.

The user data 130 can represent any number of financial and/or demographic attributes of a plurality of users associated with the debt reduction system 150. Each set of financial attributes can be indicative of credit card debt associated with a respective user, and can include, for example, an amount of previous credit card debt, an amount of current credit card debt, APRs associated with the credit card debt, payment due dates associated with the credit card debt, net savings, net cash flow, or an intent of the user to pay-off the credit card debt. The demographic attributes of each user can be organized as a demographic profile, and can include, for example, age, income level, job or profession, background, education level, family size, single-income family or a multi-income family, and so on.

The communications network 140 provides communication links between the electronic payment services 110, the credit reporting systems 120, the user data 130, and the debt reduction system 150. The communications network 140 may be any suitable one or more communication networks including, for example, the Internet, a wide area network (WAN), a metropolitan area network (MAN), a wireless local area network (WLAN), a personal area network (PAN) such as Bluetooth®, a radio access network (RAN) such as a Fifth Generation (5G) New Radio (NR) system, a wired network, a cable network, a satellite network, or any other suitable network. Accordingly, the debt reduction system 150, can monitor, in real-time, credit card charge accruals, balances, payments and the like to determine trends, behaviors, and other characteristics of a vast number of consumers associated with credit card debt.

The debt reduction system 150 can obtain, receive, or otherwise determine the financial attributes and one or more debt reduction plans used by a plurality of credit card consumers, and can transform the received information into predictive models that can be trained to determine a customized debt reduction plan for each user associated with the debt reduction system 150. In some instances, the debt reduction plans can include any one or more of an avalanche technique (which calls for paying down credit card debt having the highest APR first), a snowball technique (which calls for paying down credit card debt having the lowest outstanding balances first), and a fireball technique (which may be a hybrid of the avalanche and snowball techniques). The debt reduction system 150 can identify consumers who successfully repaid their credit card debt based on their respective financial attributes, and can determine which debt reduction plan each of the successful consumers used to repay their credit card debt.

The debt reduction system 150 can also receive demographic and financial attributes of a user, can correlate the demographic and financial attributes of the user with the demographic and financial attributes of the successful consumers to determine similarities between the user and each of the successful consumers, and can identify a group of successful consumers that are most similar to the user in one or more financial and/or demographic aspects based on the determined similarities. In some instances, the debt reduction system 150 can determine correlations between the user and each of the successful consumers by clustering the successful consumers into one or more groups based on their respective demographic and financial attributes, and then correlate the demographic and financial attributes of the user with the demographic and financial attributes associated with the one or more respective groups of successful consumers. The debt reduction system 150 can use any suitable technique for clustering the successful consumers into the one or more groups. In some instances, the debt reduction system 150 can use a Random Forest classifier to cluster the successful consumers into the one or more groups of successful consumers.

The debt reduction system 150 can train a machine learning model using correlations of demographic and financial attributes between the user and the successful consumers most similar to the user, and can use the trained machine learning model to determine a likelihood of the user repaying the credit card debt using each of the debt reduction plans employed by the successful consumers. In some instances, the machine learning model can be or can include a neural network trained to determine a probability vector based on the determined likelihoods. The probability vector may indicate a likelihood of the user successfully repaying the credit card debt within a time period for each of the debt reduction plans used by the successful consumers, and may be used to rank a wide variety of debt reduction plans based on their likelihoods of success for the user. In some instances, the neural network can use the rankings to determine a personalized debt reduction plan for the user.

The debt reduction system 150 can also determine feedback representative of how closely the user has adhered to the customized debt repayment plan, and then selectively retrain the machine learning model based on the determined feedback. For example, the debt reduction system 150 can determine that the user has deviated from the customized debt reduction plan, and use information relating to the deviation to retrain the machine learning model to determine a new debt reduction plan or to modify an existing debt reduction plan in a manner that increases the likelihood that the user will successfully repay the credit card debt. In some instances, the debt reduction system 150 can use the machine learning model to determine one or more personalized scores for the user based on one or more similarities between the user and a group of consumers determined to have successfully repaid their credit card debt, where a relatively high personalized score indicates a high degree of similarity between the user and the successful consumers, and a relatively low personalized score indicates a low degree of similarity between the user and the successful consumers. The personalized score may indicate the likelihood of the user successfully repaying the credit card debt using a corresponding debt reduction plan.

In some implementations, the user can provide his or her demographic and/or financial attributes to the debt reduction system 150 using any suitable interface or device (such as a computer, laptop, or wireless communication device) that can facilitate communications between the user and the debt reduction system 150. In some instances, the user can also provide one or more debt repayment preferences to the debt reduction system 150 via the suitable interface or device for consideration by the debt reduction system 150 when determining the customized debt reduction plan for the user. The user's preferences can include various repayment attributes such as making timely debt payments, paying at least a certain amount per month, paying no more than a certain amount per month, a time period within which to repay the credit card debt, and the like, and may more closely reflect the user's repayment capabilities than the models associated with the debt reduction system 150. In some instances, the debt reduction system 150 may use these preferences to weight one of the determined likelihoods more heavily than the other determined likelihoods when determining the probabilities vector, for example, to ensure that the customized debt reduction plan determined by the debt reduction system 150 is consistent with the user's preferences.

In some instances, the user's preferences may more closely align with a particular debt reduction plan than the probabilities vector generated by the debt reduction system 150. In such instances, the debt reduction system 150 may select the particular debt reduction plan indicated by the user's preferences as the customized debt reduction plan for the user. In addition, or in the alternative, the user's preferences may later change and more closely align with another debt reduction plan, in which case the debt reduction system 150 can modify the user's customized debt reduction plan based on the other debt reduction plan. For example, the user may initially prefer to prioritize the repayment of smaller debts, and may later prefer to prioritize the repayment of credit card debt having the highest APR. In this example, the debt reduction system 150 may initially determine a customized debt reduction plan based on the snowball repayment method, and then subsequently modify the debt reduction plan to more closely resemble the avalanche repayment method.

Figure 2:
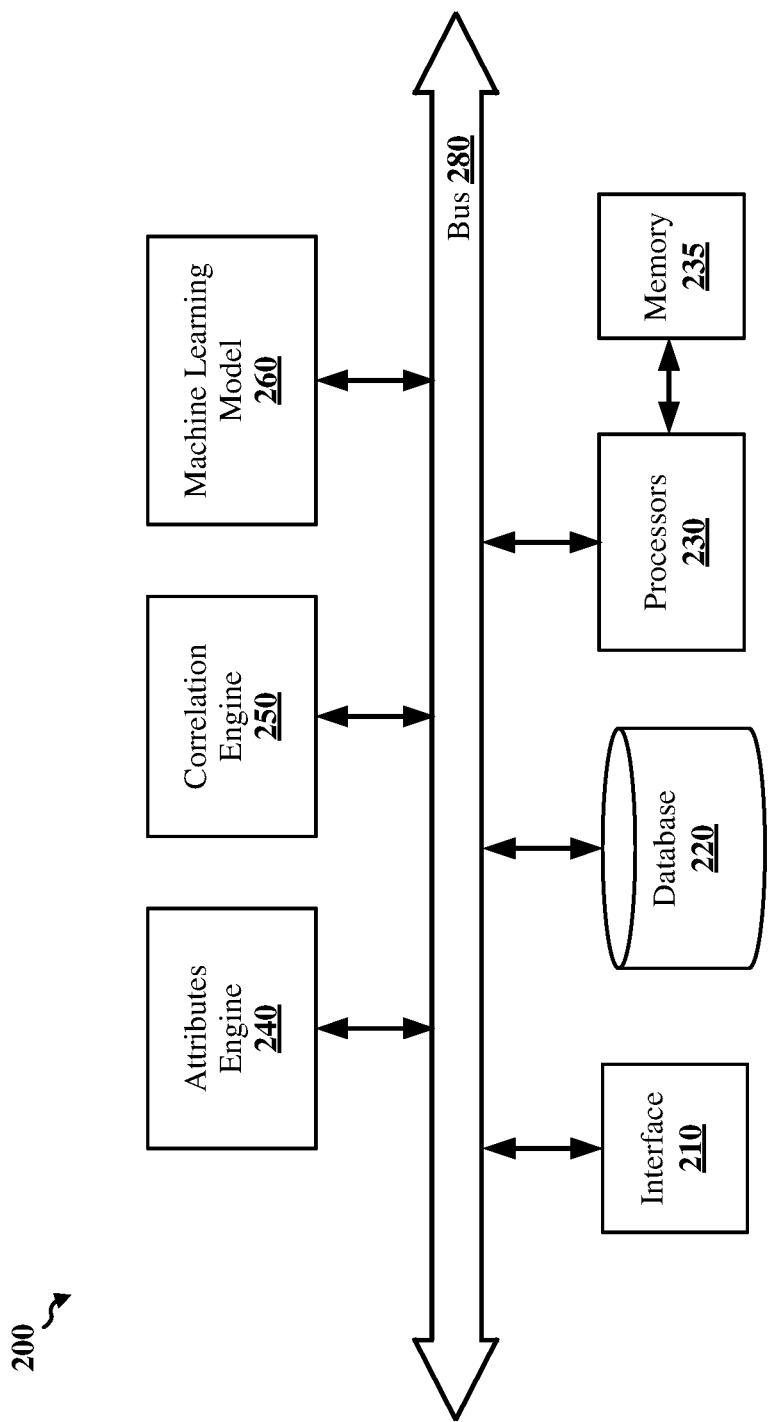
FIG. 2 shows a block diagram of a system for reducing debt, according to some implementations.

FIG. 2 shows a block diagram of a debt reduction system 200, according to some implementations. The debt reduction system 200, which can be an example of the debt reduction system 150 of FIG. 1, is shown to include an input/output (I/O) interface 210, a database 220, one or more processors 230, a memory 235 coupled to the one or more processors 230, an attributes engine 240, a correlation engine 250, a machine learning model 260, and a data bus 280. The various components of the debt reduction system 200 may be connected to one another by the data bus 280, as depicted in the example of FIG. 2. In other implementations, the various components of the debt reduction system 200 may be connected to one another using other suitable signal routing resources.

The interface 210 may include any suitable devices or components that allow a user to provide information (such as input data) to the debt reduction system 200 and/or to receive information (such as output data) from the debt reduction system 200. In some instances, the interface 210 includes at least a display screen and an input device (such as a mouse and keyboard) that allows users to interface with the debt reduction system 200 in a convenient manner. The interface 210 may also be used to exchange data and information with the electronic payment service 130 of FIG. 1. For example, the interface 210 may allow a user to provide financial attributes, demographic attributes, user preferences, or other information to the debt reduction system 200. As discussed, the financial attributes can include, for example, an amount of previous credit card debt, an amount of current credit card debt, APRs associated with the credit card debt, payment due dates associated with the credit card debt, net savings, net cash flow, or an intent of the user to pay-off the credit card debt. The demographic attributes can be organized as a demographic profile, and can include, for example, age, income level, job or profession, background, education level, family size, single-income family or a multi-income family, and so on.

The database 220 can store any suitable information pertaining to users of the debt reduction system 200, non-user consumers associated with credit card debt, financial attributes of the users and the non-user consumers, demographic attributes of the users and the non-user consumers, user preferences, debt reduction plans of the users and the non-user consumers, success rates or likelihoods of success for the users and the non-user consumers, and other suitable information that can be used to determine a customized debt reduction plan for a particular user. The database 220 can also store information identifying the successful consumers, the unsuccessful consumers, the debt reduction plans used by the successful consumers, mappings between attributes and clusters of successful consumers, mappings between each user and a number of successful consumers most similar to the user, and so on. In some instances, the database 220 can be a relational database capable of manipulating any number of various data sets using relational operators, and present one or more data sets and/or manipulations of the data sets to a user in tabular form and capable. The database 220 can also use Structured Query Language (SQL) for querying and maintaining the database, and/or can store merchant feature sets and financial information relevant to the merchants in tabular form, either collectively in an feature table or individually within each of the data sets.

The processors 230, which may be used for general data processing operations (such as transforming data stored in the database 220 or received from external sources into training data), may be one or more suitable processors capable of executing scripts or instructions of one or more software programs stored in the debt reduction system 200 (such as within the memory 235). The processors 230 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 230 may be implemented as a combination of computing devices (such as a combination of a DSP and a microprocessor, a plurality of microprocessors, one or more microprocessors in conjunction with a DSP core, or any other such configuration).

The memory 235 may be any suitable persistent memory (such as one or more nonvolatile memory elements, such as EPROM, EEPROM, Flash memory, a hard drive, etc.) that can store any number of software programs, executable instructions, machine code, algorithms, and the like that, when executed by the processors 230, causes the debt reduction system 200 to perform at least some of the operations described with reference to one or more of FIGS. 4, 5A, 5B, 6, and 7. In some instances, the memory 235 can also store training data, seed data, and/or test data for the machine learning model 260.

The attributes engine 240 can be used to receive, obtain, or determine one or more sets of financial attributes and/or demographic profiles of the users and the non-user consumers. In some instances, the attributes engine 240 can determine the mappings between attributes and clusters of successful consumers, and can determine the mappings between a user and successful consumers most similar to the user. In some other instances, the attributes engine 240 can apply weighting factors to one or more financial attributes and/or one or more demographic attributes of a user based on the user's preferences.

The correlation engine 250 can use the attributes and/or mappings received from the attributes engine 240 and correlate the demographic and financial attributes of a user with the demographic and financial attributes of the successful consumers to determine similarities between the user and each of the successful consumers. The correlation engine 250 can use the determined similarities to identify a group of successful consumers that are most similar to the user. In some instances, the correlation engine 250 can determine correlations between the user and each of the successful consumers by clustering the successful consumers into one or more groups based on their respective demographic and financial attributes, and then correlate the demographic and financial attributes of the user with the demographic and financial attributes associated with the one or more respective groups of successful consumers. The correlation engine 250 can use any suitable technique for clustering the successful consumers into the one or more groups. In some instances, the correlation engine 250 can be or can include a Random Forest classifier to cluster the successful consumers into the one or more groups of successful consumers.

The machine learning model 260 can include any suitable number of machine learning engines, and can take the form of an extensible data structure that represents sets of behaviors, features, or characteristics of one or more of the users and the non-user consumers associated with credit card debt. In some implementations, the machine learning model 260 can implement one or more machine learning algorithms such as, for example, decision trees, random forests, logistic regression, nearest neighbors, classification trees, Bayesian Networks, Latent Dirichlet allocations, Random Forest classifiers, and neural networks to determine a customized debt reduction plan for a user. The machine learning model 260 can be trained, using correlations of demographic and financial attributes between the user and the successful consumers most similar to the user, to determine a likelihood of the user repaying the credit card debt using each of the debt reduction plans employed by the successful consumers. In some instances, the machine learning model can be or can include a neural network trained to determine a probability vector based on the determined likelihoods. The probability vector may indicate a likelihood of the user successfully repaying the credit card debt within a time period for each of the debt reduction plans used by the successful consumers, and may be used to rank a wide variety of debt reduction plans based on their likelihoods of success for the user. In some instances, the neural network can use the rankings to determine a personalized debt reduction plan for the user. The machine learning model 260 can also be updated or modified based on the degree to which the user is adhering to the customized debt reduction plan and/or whether the user is meeting certain goals or milestones in paying-off the credit card debt.

The particular architecture of the debt reduction system 200 shown in FIG. 2 is but one example of a variety of different architectures within which aspects of the present disclosure may be implemented. For example, in other implementations, the debt reduction system 200 may not include attributes engine 240, the functions of which can be implemented by the processors 230 executing corresponding instructions or scripts stored in the memory 235. Similarly, in some other implementations, one or more of the functions performed by the correlation engine 250 can be performed by the processors 230 executing corresponding instructions or scripts stored in the memory 235.

Figure 3:
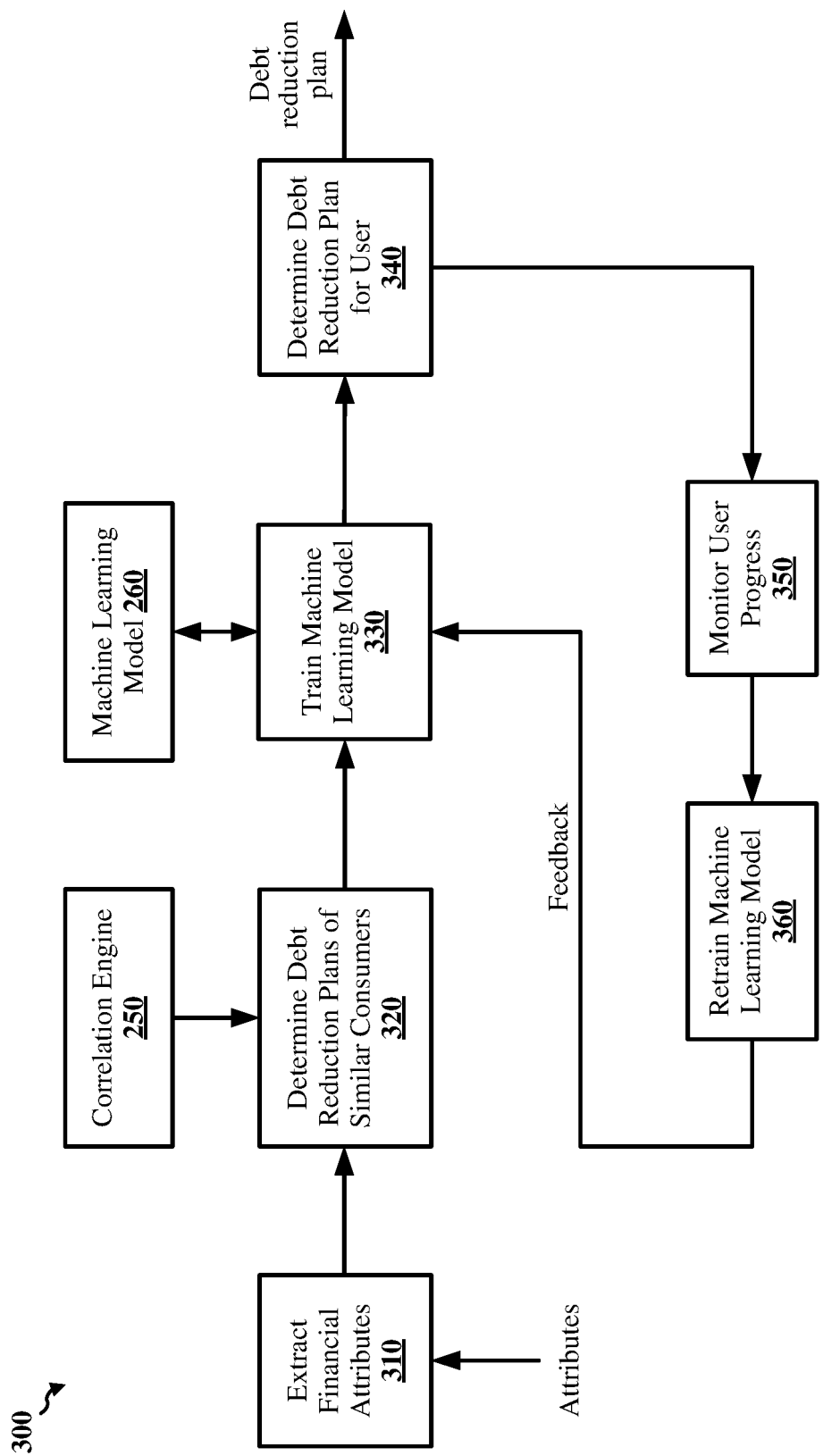
FIG. 3 shows an example process flow that can be employed by the system of FIG. 2, according to some implementations.

FIG. 3 shows an example process flow 300 that can be performed by the debt reduction system 200 of FIG. 2, according to some implementations. At block 310, the system 200 receives and extracts demographic and financial attributes of a plurality of consumers. The system 200 can also receive and extract demographic and financial attributes of a user of the system 200. The financial attributes can include, for example, an amount of previous credit card debt, an amount of current credit card debt, APRs associated with the credit card debt, payment due dates associated with the credit card debt, net savings, net cash flow, or an intent of the user to pay-off the credit card debt. The demographic attributes can be organized as a demographic profile, and can include, for example, age, income level, job or profession, background, education level, family size, single-income family or a multi-income family, and so on.

At block 320, the system 200 uses the financial attributes to identify a number of the consumers who successfully repaid their credit card debt, and determines the particular debt reduction plan used by each of the successful consumers. The system 200 can also identify a group of successful consumers that are most similar to the user in one or more financial and/or demographic aspects based on the determined similarities. The system 200 can determine correlations between the user and each of the successful consumers by clustering the successful consumers into one or more groups based on their respective demographic and financial attributes, and then correlate the demographic and financial attributes of the user with the demographic and financial attributes associated with the one or more respective groups of successful consumers.

At block 330, the system 200 trains the machine learning model 260, using the correlations of financial attributes and demographic profiles between the user and the successful consumers most similar to the user, to determine a likelihood of the user repaying the credit card debt using each of the determined debt reduction plans. In some instances, the system 200 can use a neural network trained to determine a probability vector based on the determined likelihoods where, for example, the probability vector indicates a likelihood of the user successfully repaying the credit card debt within a time period for each of the debt reduction plans used by the successful consumers. The probability vector can be used to rank a wide variety of debt reduction plans based on their likelihoods of success for the user.

At block 340, the system 200 determines a customized debt reduction plan for the user based on the likelihoods of the user being able to repay the credit card debt using the debt reduction plans employed by successful consumers most similar to the user. In some instances, the customized debt reduction plan can be determined by the machine learning model 260, while in other instances, the customized debt reduction plan can be determined by the one or more processors 230 in conjunction with the machine learning model 260.

At block 350, the system 200 monitors the user's progress using the customized debt reduction plan to reduce (or eliminate) the credit card debt, and determines feedback information indicative of the user's progress.

At block 360, the system 200 retrains the machine learning model based on the determined feedback, and may modify the customized debt reduction plan using the retrained machine learning model. For example, if the user is determined to have not reduced the amount credit card debt by at least a certain amount within a time period using the customized debt reduction plan, the system 200 can use the feedback information to retrain the machine learning model 260 to improve the accuracy with which the machine learning model 260 predicts the likelihood of each determined debt reduction plan being successfully employed by the user to reduce or eliminate the credit card debt. Conversely, if the user is determined to have reduced the amount credit card debt by the certain amount within the time period using the customized debt reduction plan, the system 200 may not retrain the machine learning model 260, for example, because the customized debt reduction plan is being used effectively by the user to reduce the credit card debt.

If the user fails to meet one or more of the goals or milestones, the system 200 can use financial transaction data, credit card information, cash flow, and other financial attributes of the user to retrain the machine learning model 260. In this way, the system 200 can more accurately tailor the customized debt reduction plan for user to any one or more of the input preferences of the user 130 or the observed debt repayment performance of the user 130 over time relative to the other users 120 identified as successfully repaying their debt. The example process flow 300 can be configured to run iteratively through multiple cycles to refine itself regarding how closely the customized debt reduction plan matches the likelihood that the user 130 will successfully repay his or her outstanding credit card debt in a defined time frame.

Figure 4:
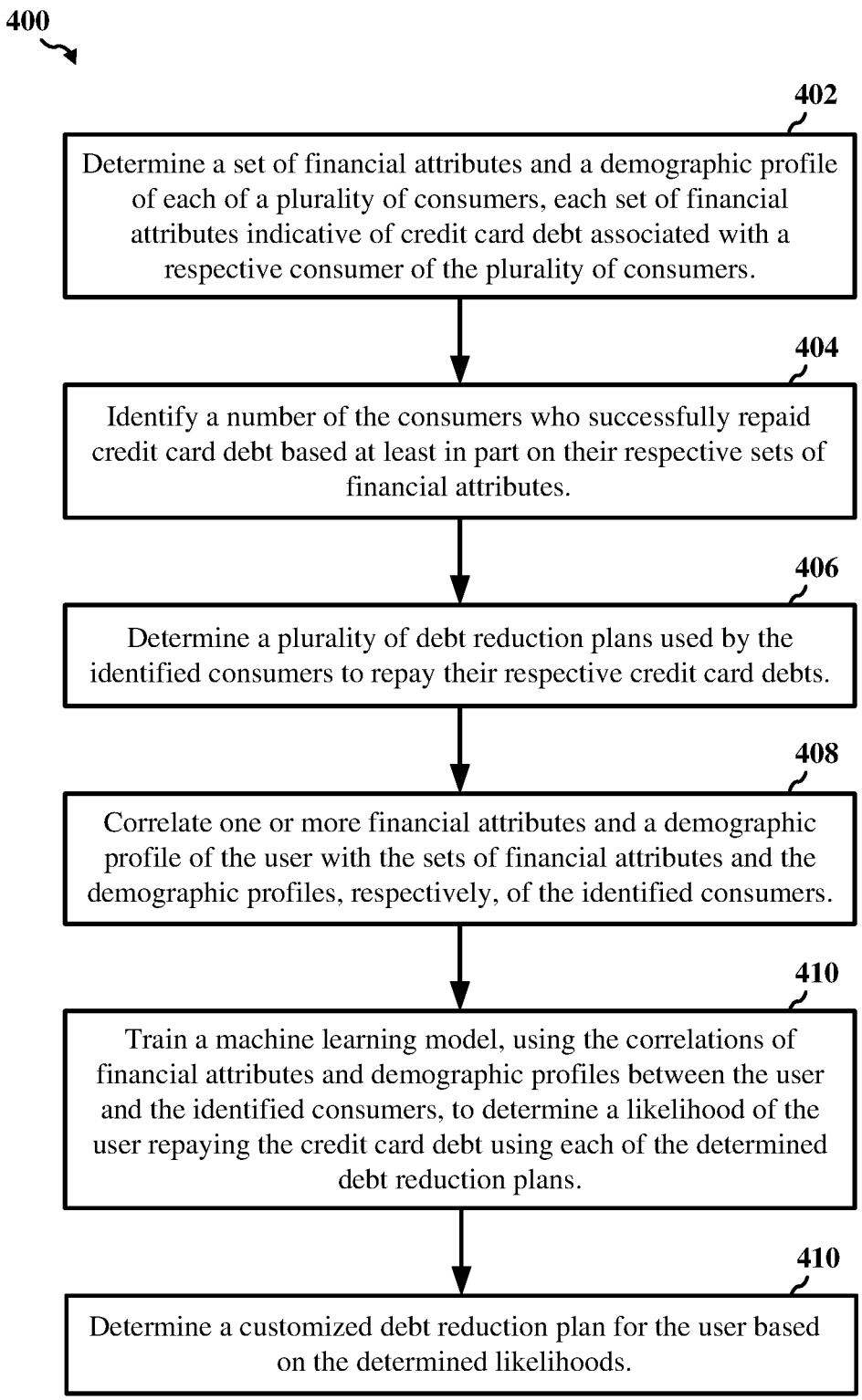
FIG. 4 shows an illustrative flowchart depicting an example operation for determining a customized debt reduction plan for a user, according to some implementations.

FIG. 4 shows an illustrative flowchart depicting an example operation 400 for determining a customized debt reduction plan for a user, according to some implementations. In some instances, the operation 400 can be performed by the one or more processors 230 in conjunction with the machine learning model 260 of the system 200 of FIG. 2. In some other instances, one or more portions of the operation 400 may be performed or implemented based on the example process flow 300 of FIG. 3. At block 402, the system determines a set of financial attributes and a demographic profile of each of a plurality of consumers. In some instances, each set of financial attributes is indicative of credit card debt associated with a respective consumer of the plurality of consumers. At block 404, the system identifies a number of the consumers who successfully repaid credit card debt based at least in part on their respective sets of financial attributes. At block 406, the system determines a plurality of debt reduction plans used by the identified consumers to repay their respective credit card debts. At block 408, the system correlates one or more financial attributes and a demographic profile of the user with the sets of financial attributes and the demographic profiles, respectively, of the identified consumers. At block 410, the system trains a machine learning model, using the correlations of financial attributes and demographic profiles between the user and the identified consumers, to determine a likelihood of the user repaying the credit card debt using each of the determined debt reduction plans. At block 412, the system determines a customized debt reduction plan for the user based on the determined likelihoods.

Each set of financial attributes can be indicative of credit card debt associated with respective consumer, and may include one or more of an amount of previous credit card debt of a respective consumer, an amount of current credit card debt of the respective consumer, an annual percentage rate (APR) associated with the credit card debt of the respective consumer, payment due dates associated with the credit card debt of the respective consumer, net savings of the respective consumer, net cash flow of the respective consumer, or an intent of the respective consumer to pay-off the credit card debt. The financial attributes of a respective consumer can be extracted from electronic transactions, credit card transactions, credit scores, banking information, or any other suitable source of information pertaining to or indicative of the likelihood that the respective consumer is or may be able to replay the credit card debt within a time period (such as a year). The demographic profile for a respective consumer can include one or more of a profession, employment status, an age, a level of education, or an indication of a single-income family or a multi-income family.

The debt reduction plans can be based on one or more of an available savings and net positive cash flow of a consumer, a consolidation-based debt reduction plan, an avalanche-based debt reduction plan, a snowball-based debt reduction plan, or any other suitable plan, technique, or mechanism for reducing consumer credit card debt.

The machine learning model can be or include any suitable machine learning model that can be trained to predict or determine the probability of each debt reduction plan being successful in facilitating the user repaying the credit card debt. In some instances, the machine learning model can be a neural network trained or configured to determine a probability vector indicative of a likelihood of the user successfully repaying the credit card debt within a time period based on each of the debt reduction plans used by the consumers identified as having successfully repaid their credit card debt. In other instances, the machine learning model can be a decision tree or a Bayesian network. In some other instances, the machine learning model can employ regression analysis to predict or determine the probability of each debt reduction plan being successful in facilitating the user repaying the credit card debt.

Figure 5A:
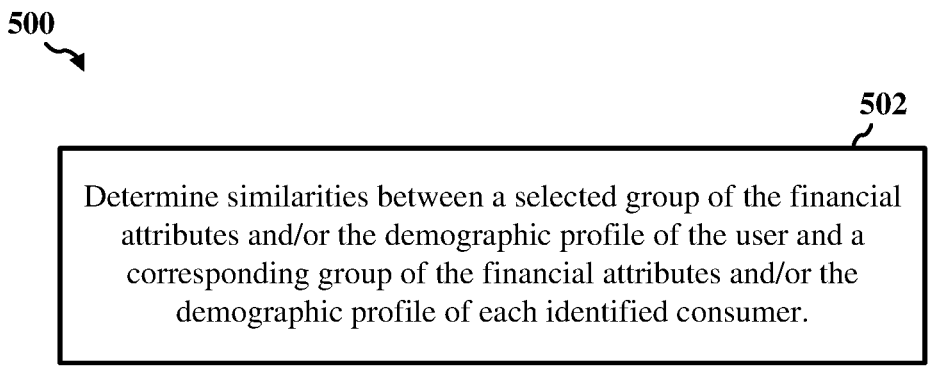
FIG. 5A shows an illustrative flowchart depicting an example operation for correlating demographic and financial attributes of a user with demographic and financial attributes of consumers, according to some implementations.

In some implementations, the demographic and financial attributes of the user can be correlated with the demographic and financial attributes of the identified consumers based on similarities between one or more financial attributes and/or demographic attributes. For example, FIG. 5A shows an illustrative flowchart depicting an example operation 500 for correlating demographic and financial attributes of the user with demographic and financial attributes of the identified consumers, according to some implementations. In some instances, the operation 500 can be performed by the one or more processors 230 in conjunction with the machine learning model 260 of the system 200 of FIG. 2. In some other instances, one or more portions of the operation 500 can be performed or implemented based on the example process flow 300 of FIG. 3. In some implementations, the operation 500 can be an example of correlating demographic and financial attributes of the user in block 408 of FIG. 4. For example, at block 502, the system determines similarities between a selected group of the financial attributes and/or the demographic profile of the user and a corresponding group of the financial attributes and/or the demographic profile of each identified consumer.

Figure 5B:
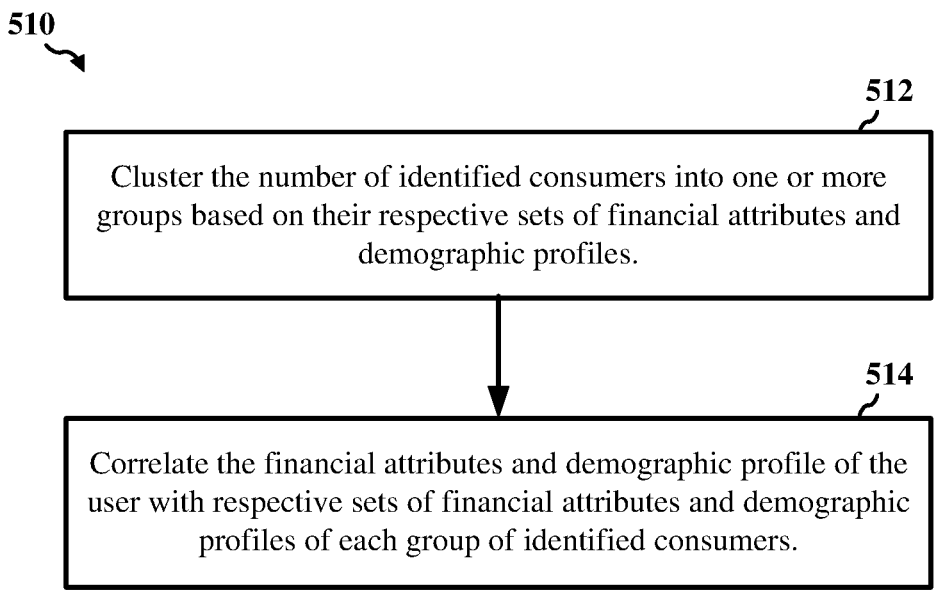
FIG. 5B shows an illustrative flowchart depicting an example operation for correlating demographic and financial attributes of the user with demographic and financial attributes of the consumers, according to some other implementations.

In some other implementations, the demographic and financial attributes of the user can be correlated with the demographic and financial attributes of the identified consumers based on clustering the identified consumers into one or more groups. For example, FIG. 5B shows an illustrative flowchart depicting an example operation 510 for correlating demographic and financial attributes of the user with demographic and financial attributes of the identified consumers, according to some other implementations. In some instances, the operation 510 can be performed by the one or more processors 230 in conjunction with the machine learning model 260 of the system 200 of FIG. 2. In some other instances, one or more portions of the operation 510 can be performed or implemented based on the example process flow 300 of FIG. 3. In some implementations, the operation 510 can be another example of correlating demographic and financial attributes of the user in block 408 of FIG. 4. For example, at block 512, the system clusters the number of identified consumers into one or more groups based on their respective sets of financial attributes and demographic profiles. At block 514, the system correlates the financial attributes and demographic profile of the user with respective sets of financial attributes and demographic profiles of each group of the one or more groups of identified consumers.

Figure 6:
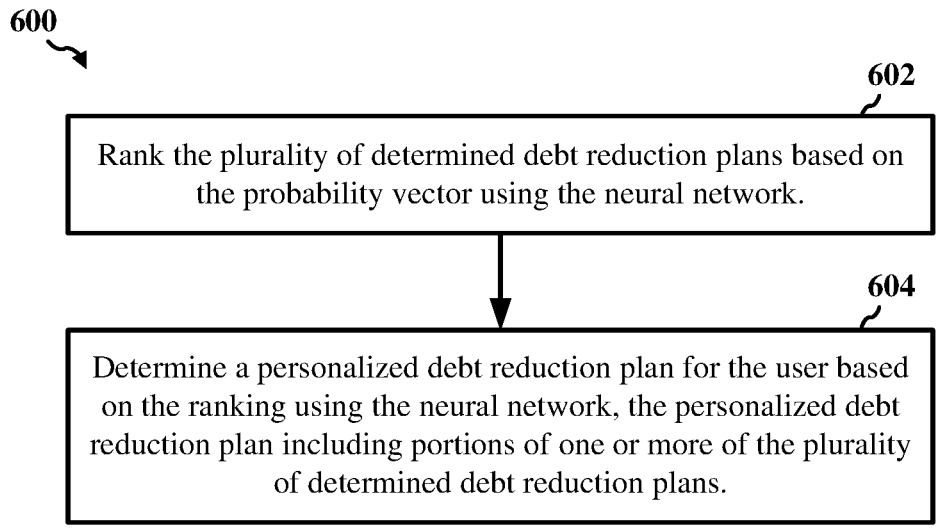
FIG. 6 shows an illustrative flowchart depicting an example operation for determining a personalized debt reduction plan for the user, according to some implementations.

FIG. 6 shows an illustrative flowchart depicting an example operation 600 for determining a personalized debt reduction plan for the user, according to some implementations. In some instances, the operation 600 can be performed by the one or more processors 230 in conjunction with the machine learning model 260 of the system 200 of FIG. 2. In some other instances, one or more portions of the operation 600 can be performed or implemented based on the example process flow 300 of FIG. 3. In some implementations, the operation 600 can be an example of determining the customized debt reduction plan in block 412 of FIG. 4. For example, at block 602, the system ranks the plurality of determined debt reduction plans based on the probability vector using the neural network. At block 604, the system determines a personalized debt reduction plan for the user based on the ranking using the neural network, wherein the personalized debt reduction plan can include portions of one or more of the plurality of determined debt reduction plans.

Figure 7:
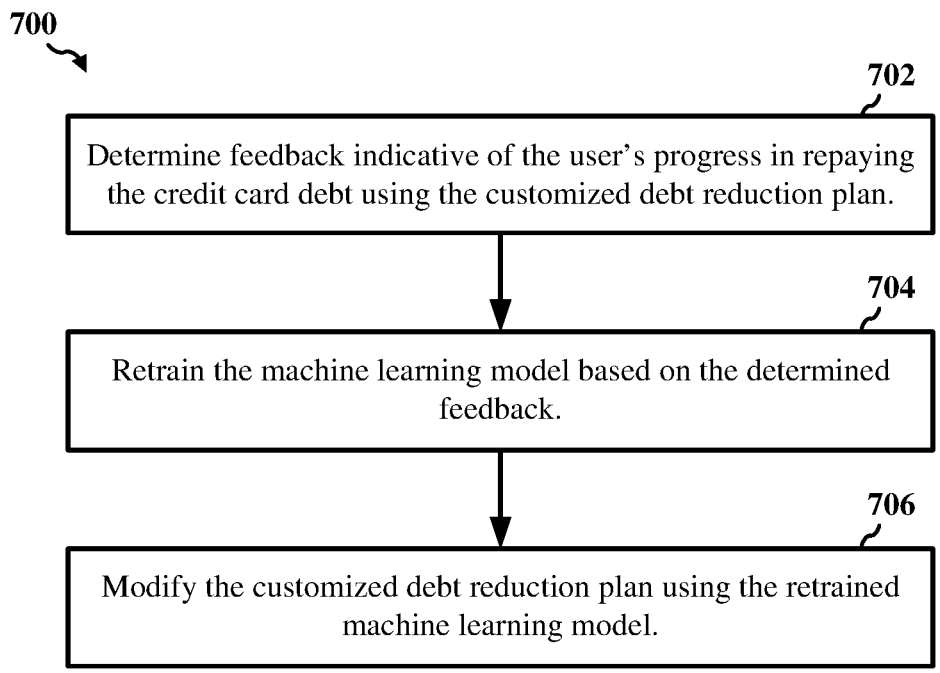
FIG. 7 shows an illustrative flowchart depicting an example operation for modifying the customized debt reduction plan, according to some implementations.

FIG. 7 shows an illustrative flowchart depicting an example operation 700 for modifying the customized debt reduction plan, according to some implementations. In some instances, the operation 700 can be performed by the one or more processors 230 in conjunction with the machine learning model 260 of the system 200 of FIG. 2. In some other instances, one or more portions of the operation 700 may be performed or implemented based on the example process flow 300 of FIG. 3. In some implementations, the operation 700 can be performed after determining the customized debt reduction plan in block 412 of FIG. 4. For example, at block 702, the system determines feedback indicative of the user's progress in repaying the credit card debt using the customized debt reduction plan. At block 704, the system retrains the machine learning model based on the determined feedback. At block 706, the system modifies the customized debt reduction plan using the retrained machine learning model.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method performed by one or more processors of a computer-based debt reduction system and comprising:
    determining a set of financial attributes and a demographic profile of each of a plurality of consumers, each set of financial attributes indicative of credit card debt associated with a respective consumer of the plurality of consumers;
    identifying a number of the consumers who successfully repaid credit card debt based at least in part on their respective sets of financial attributes;
    determining a plurality of debt reduction techniques used by the identified consumers to repay their respective credit card debts;
    identifying correlations, using a correlation engine including at least one classifier, between at least one of financial attributes of a user and the sets of financial attributes or a demographic profile of the user and the demographic profiles;
    training a machine learning model, using the correlations, to predict, for each of the debt reduction techniques, a likelihood of the user repaying the credit card debt using the debt reduction technique;
    predicting, using the trained machine learning model, a likelihood, for each of the debt reduction techniques, that, given the user's financial attributes and demographic profile, the user will successfully repay the credit card debt using the debt reduction technique;
    identifying, based on the predicted likelihoods, the one of the debt reduction techniques that, if used by the user, is most likely to result in the user successfully repaying the credit card debt;
    retrieving feedback data representative of whether the user is successfully repaying the credit card debt using the identified debt reduction technique; and
    retraining the trained machine learning model, using the feedback data, to more accurately predict a likelihood that a given debt reduction technique will result in a given user successfully repaying credit card debt.

2. The method of claim 1, wherein the financial attributes indicate at least one of an amount of previous credit card debt associated with the respective consumer, an amount of current credit card debt associated with the respective consumer, an annual percentage rate (APR) associated with at least one of the previous credit card debt or the current credit card debt, one or more payment due dates associated with the respective consumer, a net savings associated with the respective consumer, a net cash flow associated with the respective consumer, or an intent of the respective consumer to pay-off the current credit card debt.

3. The method of claim 1, wherein the demographic profile for the respective consumer includes one or more of a profession of the respective consumer, an employment status of the respective consumer, an age of the respective consumer, a level of education held by the respective consumer, or a family income status associated with the respective consumer.

4. The method of claim 1, wherein the correlating includes:
    clustering the identified consumers into one or more groups based on their financial attributes and demographic profiles; and
    identifying similarities among the user's financial attributes and demographic profile and the financial attributes and demographic profiles associated with the one or more groups.

5. The method of claim 1, wherein the trained machine learning model incorporates a neural network, the method further comprising:
    generating a probability vector for each debt reduction technique based on the predicted likelihoods.

6. The method of claim 5, wherein the probability vector indicates, for each debt reduction technique, the likelihood predicted for the respective debt reduction technique.

7. The method of claim 5, wherein the identifying includes:
    ranking, using the neural network, the plurality of debt reduction techniques based on the probability vector; and
    generating a custom debt reduction technique for the user based on the ranking, the custom debt reduction technique including at least a portion of one or more of the debt reduction techniques.

8. The method of claim 1, wherein the financial attributes are extracted from at least one of financial transactions associated with the respective consumer or the respective consumer's credit score.

9. A system comprising:
    one or more processors;
    a machine learning model communicatively coupled with the one or more processors;
    a correlation engine including at least one classifier; and
    a memory communicatively coupled with the one or more processors and the machine learning model, the memory storing instructions that, when executed by the one or more processors in conjunction with the machine learning model, cause the system to perform operations including:
        determining a set of financial attributes and a demographic profile of each of a plurality of consumers, each set of financial attributes indicative of credit card debt associated with a respective consumer of the plurality of consumers;

identifying a number of the consumers who successfully repaid credit card debt based at least in part on their respective sets of financial attributes;

determining a plurality of debt reduction techniques used by the identified consumers to repay their respective credit card debts;

identifying correlations, using a correlation engine including at least one classifier, between at least one of financial attributes of a user and the sets of financial attributes or a demographic profile of the user and the demographic profiles;

training a machine learning model, using the correlations, to predict, for each of the debt reduction techniques, a likelihood of the user repaying the credit card debt using the debt reduction technique;

predicting, using the trained machine learning model, a likelihood, for each of the debt reduction techniques, that, given the user's financial attributes and demographic profile, the user will successfully repay the credit card debt using the debt reduction technique;

identifying, based on the predicted likelihoods, the one of the debt reduction techniques that, if used by the user, is most likely to result in the user successfully repaying the credit card debt;

retrieving feedback data representative of whether the user is successfully repaying the credit card debt using the identified debt reduction technique; and retraining the trained machine learning model, using the feedback data, to more accurately predict a likelihood that a given debt reduction technique will result in a given user successfully repaying credit card debt.

10. The system of claim 9, wherein the financial attributes indicate at least one of an amount of previous credit card debt associated with the respective consumer, an amount of current credit card debt associated with the respective consumer, an annual percentage rate (APR) associated with at least one of the previous credit card debt or the current credit card debt, one or more payment due dates associated with the respective consumer, a net savings associated with the respective consumer, a net cash flow associated with the respective consumer, or an intent of the respective consumer to pay-off the current credit card debt.

11. The system of claim 9, wherein the demographic profile for the respective consumer includes one or more of a profession of the respective consumer, an employment status of the respective consumer, an age of the respective consumer, a level of education held by the respective consumer, or a family income status associated with the respective consumer.

12. The system of claim 9, wherein execution of the instructions further causes the system to perform operations including:

clustering the identified consumers into one or more groups based on their financial attributes and demographic profiles; and identifying similarities among the user's financial attributes and demographic profile and the financial attributes and demographic profiles associated with the one or more groups.

13. The system of claim 9, wherein the trained machine learning model incorporates a neural network, and wherein execution of the instructions further causes the system to perform operations including:

generating a probability vector for each debt reduction technique based on the predicted likelihoods.

14. The system of claim 13, wherein the probability vector indicates, for each debt reduction technique, the likelihood predicted for the respective debt reduction technique.

15. The system of claim 13, wherein execution of the instructions further causes the system to perform operations including:

ranking, using the neural network, the plurality of debt reduction techniques based on the probability vector; and generating a custom debt reduction technique for the user based on the ranking, the custom debt reduction technique including at least a portion of one or more of the debt reduction techniques.

16. The system of claim 9, wherein the financial attributes are extracted from at least one of financial transactions associated with the respective consumer or the respective consumer's credit score.

17. The method of claim 1, wherein the feedback data indicates that the user deviated from the identified debt reduction technique, the method further comprising:

retraining the trained machine learning model using information related to the user's deviation; and identifying, using the retrained machine learning model, a new debt reduction technique for the user based on the information related to the user's deviation.

18. The method of claim 1, further comprising:

determining, using the trained machine learning model, a personalized score for the user based on similarities between the user and the consumers who successfully repaid credit card debt, wherein a relatively high personalized score indicates a relatively high degree of similarity between the user and the consumers who successfully repaid credit card debt, and wherein the likelihoods are predicted based at least in part on the personalized score.

19. The method of claim 1, further comprising:

determining one or more debt repayment preferences of the user, the one or more debt repayment preferences including at least one of a preference for paying off debt in a timely manner, a preference for paying off a minimum amount of debt per month, a preference for paying no more than a maximum amount of debt per month, or a preference for paying off debt within a specified time period; and weighting one or more of the predicted likelihoods based on the user's debt repayment preferences.

20. The method of claim 19, further comprising:

determining that one or more of the user's debt repayment preferences have changed; and reweighting one or more of the predicted likelihoods based on the changes to the user's debt repayment preferences.

* * * * *